United States Patent

Hopkins et al.

[15] 3,635,404
[45] Jan. 18, 1972

[54] SPIN STABILIZING ROCKET NOZZLE

[72] Inventors: Wayne J. Hopkins, College Park; James K. Watson, Potomac, both of Md.

[73] Assignee: The United States of America as represented by the Secretary of the Navy

[22] Filed: June 18, 1970

[21] Appl. No.: 47,478

[52] U.S. Cl. ............239/265.15, 239/265.19, 239/DIG. 19
[51] Int. Cl. ..........................................................B64d 33/04
[58] Field of Search.........239/265.15, 265.19, 382, DIG. 19; 60/201, 228, 230; 244/3.23

[56] References Cited

UNITED STATES PATENTS

| | | |
|---|---|---|
| 3,096,049 | 7/1963 | Karasinski..............................60/230 X |
| 3,468,127 | 9/1969 | Rosser........................239/265.15 X |
| 2,405,415 | 8/1946 | Eksergian..............................60/201 X |
| 2,624,281 | 1/1953 | McNally....................................60/201 |

*Primary Examiner*—M. Henson Wood, Jr.
*Assistant Examiner*—Edwin D. Grant
*Attorney*—R. S. Sciascia, R. J. Erickson and J. A. Cooke

[57] ABSTRACT

A rocket nozzle having a plurality of internal vanes located downstream of the nozzle throat for imparting rotational spin to the rocket about its longitudinal axis. Each vane may have a nonablative body having a cross section symmetric with the nozzle axis and a consummable ablative body attached thereto to provide a composite cross section asymmetric to the nozzle axis. The ablative material, imparts spin stabilization to the rocket leaving only the symmetric nonablative vane portions, thus preventing excessive spin rates.

7 Claims, 4 Drawing Figures

PATENTED JAN 18 1972

3,635,404

Wayne J. Hopkins
James K. Watson
INVENTORS

BY
ATTORNEYS

SPIN STABILIZING ROCKET NOZZLE

BACKGROUND OF THE INVENTION

This invention relates generally to reaction thrust motors and more particularly to a reaction thrust motor nozzle for spin stabilizing a rocket powered vehicle.

In the assembly of rocket powered vehicles, such for example as unguided ballistic missiles, it is difficult to accurately align the thrust chamber and the nozzle of the rocket motor and consequently it is not uncommon for assembled rockets to have slightly misaligned rocket motor which condition causes the rocket to deviate from its intended flight path. The effects of thrust chamber misalignment may be counteracted by causing the rocket to spin about its longitudinal axis. Since the effects of thrust chamber misalignment are severe during the early stages of flight, it is desirable that the spin stabilization be achieved after ignition of the rocket motor and prior to its exit from the launching device and entry into free flight. Additionally, since there exists an optimum rate of spin for the rocket motor system it is further desirable that any spin inducing system be designed to achieve the optimum spin rate during launch and early stages of free flight and then to become disabled to prevent the rocket from exceeding the optimum spin rate.

Heretofore various systems have been used to impart spin stabilization to a rocket such as the use of helical drive rails on the launching structure and a set of rail runners on the missile. Such arrangements add undesirable complexity to the launch structure and restrict the maximum diameter of a missile which may be launched in such a structure. Additionally, the drive rails and lugs may impart undesirable forces and moments on the launching structure. Other spin stabilizing systems have employed radially directed discharge nozzles or inclined aerodynamic fins mounted externally on the rocket motor housing to impart rotational spin to the rocket. The principle disadvantage of the radially directed discharge nozzles is choking and overspin during free flight if acceptable spin is given during launch. The inclined external fins suffer from the disadvantage that the optimum spin rates are not attained until the rocket reaches its terminal stages of flight and, consequently, the rocket has insufficient spin stabilization during the early stages of free flight when the effects of thrust misalignment are most severe. Ablative materials have also been used in the form of fluted rings located just upstream of the nozzle throat to impart rotational spin to a rocket only during the initial period of flight. The inclined ribs defined by the fluted ring function satisfactorily in many applications to impart rotational spin to a rocket during launching, however, the characteristics of many rockets are such that they require spin rates of a magnitude beyond the capabilities of the fluted rings. Although the spin inducing capability of the fluted ring can be increased by enlarging the height of the ribs and increasing the angle of inclination thereof, it has been found that both the size of the ribs and the angles thereof must be restricted to an extent necessary to prevent choking of the rocket motor because most propellants have the characteristic that excessive positive pressure will cause the propellant to explode in the rocket motor chamber.

SUMMARY OF THE INVENTION

Accordingly, one object of this invention is to provide a new and improved spin inducing system for flight stabilization of rocket powered vehicles.

Another object of the invention is the provision of a spin stabilizing system in which the spin inducing force is variable inversely with the burning time of the rocket motor.

Still another object of the present invention is to provide a reaction thrust motor nozzle for spin stabilization an aerial vehicle in flight.

A further object of the instant invention is to provide a system for imparting a predetermined rotational velocity to a rocket powered vehicle immediately after ignition of a rocket motor.

Briefly, in accordance with one embodiment of this invention, these and other objects are attained by providing a reaction thrust nozzle for a rocket powered vehicle having a plurality of vanes mounted in the divergent portion of the nozzle at a position downstream of the nozzle throat. Each of the vanes includes a body of ablative material having a cross section asymmetric with respect to the longitudinal axis of the nozzle to provide a rotational force moment to the nozzle when acted upon by the exhaust gases, which force moment decreases as the ablative material is consumed by the hot exhaust gases.

BRIEF DESCRIPTION OF THE DRAWINGS

A more complete understanding of the invention and many of the attendant advantages thereof will be readily appreciated as the same becomes better understood by reference to the following detailed description when considered in connection with the accompanying drawings wherein.

DESCRIPTION OF THE PREFERRED EMBODIMENT

Figure 1:
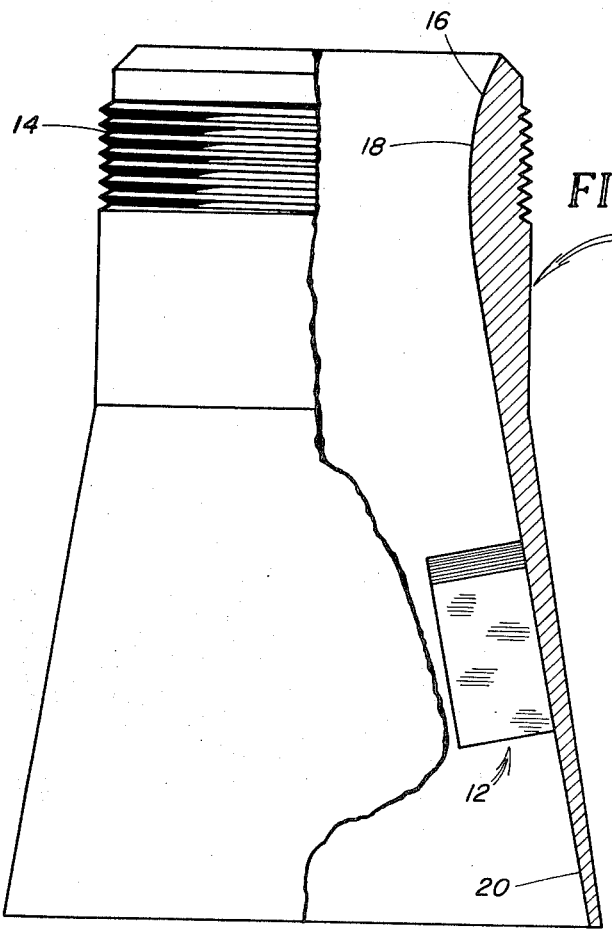
FIG. 1 is a side elevation, partially in section, of the reaction motor thrust nozzle of this invention.
Figure 2:
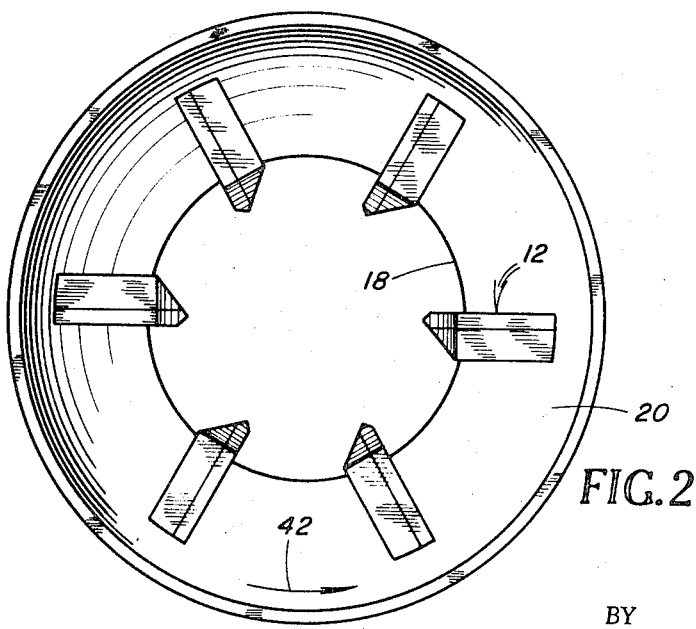
FIG. 2 is an end view of the reaction motor thrust nozzle of this invention.

Referring now to the drawings wherein like reference characters designate identical or corresponding parts throughout the several views, and more particularly to FIG. 1 thereof wherein the spin inducing rocket nozzle of the present invention is shown as consisting essentially of a reaction thrust nozzle indicated generally by reference character 10 and a plurality of spin inducing vanes indicated generally by reference character 12. The exterior of the nozzle may be provided with a threaded portion 14 for threadedly mounting the nozzle to the thrust chamber of a rocket motor in coaxial alignment with the thrust chamber, not shown. The interior of the thrust nozzle has a converging inlet 16 defining a throat portion 18 and a conically diverging exhaust portion 20 for the hot gases generated by the rocket motor. As shown in FIG. 1 and FIG. 2, spin inducing vanes 12 are mounted in the conically divergent exhaust portion 20 of the rocket nozzle at equiangularly spaced positions about the axis of the nozzle and in the same transverse plane. Although FIG. 2 illustrates six spin inducing vanes, each spaced apart by a 60° angle with respect to the nozzle axis, it should be understood that the nozzle may be designed with a lesser number of larger sized vanes or, alternatively, with a greater number of smaller sized vanes.

Figure 4:
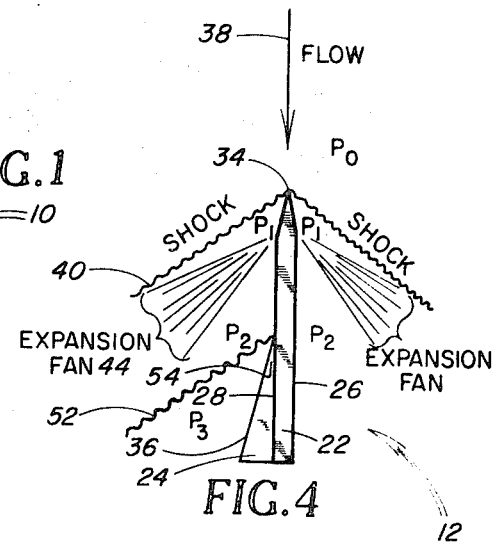
FIG. 4 is a plan view of a vane portion of the nozzle.
Figure 3:
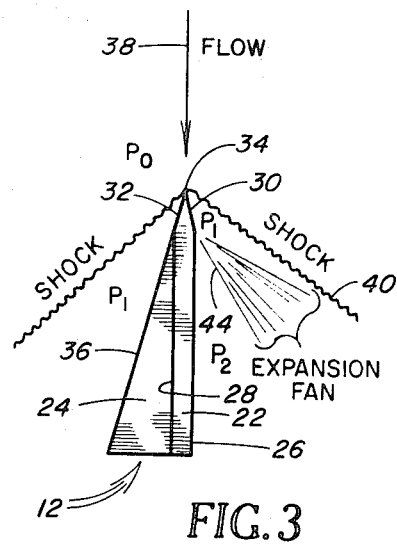
FIG. 3 is a plan view of a vane portion of the nozzle.

The structure of the vanes, in accordance with a preferred embodiment of this invention, and their interaction with the gas stream will be more fully described in conjunction with FIGS. 3 and 4. Referring now particularly to FIG. 3, each of the vanes 12 includes a vane support plate 22, which may be attached to the nozzle by welding or other suitable means, and an ablative body portion 24 attached thereto by any suitable means such as, for example, by adhesives. It will be appreciated that body portion 24 may also be formed of a disintegrating material with a protective coating that wears or burns away. The vane support plates 22 have a generally rectangular cross section with two parallel sidewalls 26 and 28 parallel to the axis of the nozzle and which, at their upstream ends, preferably have tapered portions 30 and 32 defining a knife edge 34 upon which the rocket exhaust gases impinge. In the preferred embodiment shown in FIG. 3, the ablative body portion 24 of the vane has a configuration of a solid right triangle in which the hypotenuse of the triangle forms a continuation of one of the tapered portions 32 of the vane support plate 22.

The vanes are positioned in the conically divergent exhaust portion 20 of the rocket nozzle where the exhaust gases impinging upon the vanes in the direction of the arrow 38 are travelling at supersonic speeds. Thus, a shock front 40 is created when the gases impinge upon the knife edge 34 of the vanes. Since the ablative body portion 24 is present on only one side 28 of the vane, an expansion fan develops on the side of the vane adjacent to surface 26 while the presence of the ablative body portion 24 on the side 28 of the vane prevents the development of an expansion fan on that side of the vane. The formation of an expansion fan on only one side of each vane creates a pressure differential across, or between, surfaces 36 and 26 of the vanes thus imparting a rotative moment of force on the vanes about the nozzle axis which, in turn, imparts spin to the rocket nozzle.

Upstream of the shock wave front 40, the exhaust gases are at a pressure $Po$ while the pressure in the zone between the shock wave front and the expansion fan is at a higher pressure $P_1$. The pressure of the gases in the zone behind the expansion fan adjacent to and acting upon surface 26 of the vanes is at a pressure $P_2$ which is less than the pressure $P_1$. Because the presence of the ablative body portion 24 of the vanes prevents the development of an expansion fan behind the shock wave on that side of the vanes adjacent to the ablative body, the surface 36 of the ablative body portion 24 is acted upon by gases at a pressure $P_1$. By reason of the pressure $P_1$ being greater than pressure $P_2$, the side of the vane having the ablative material thereon is acted upon by a larger force then the force acting upon the opposite side of the vane thereby developing a net rotational moment of force. This net rotational moment of force acting upon each of the vanes induces rotational spin to the rocket nozzle about its longitudinal axis in the direction of arrowhead 42 in FIG. 2. The continued flow of the supersonic exhaust gases across the vanes progressively consumes the ablative body portion 24 of the vanes. As the ablative material 24 is worn or burnt away, (FIG. 4) the front part of the parallel plate 22 is exposed. Thus, for this front part of the vane, the flow is symmetrical on both sides with shock waves 40 and expansion fans 44 giving the same pressures $P_1$ and $P_2$ on both sides.

As the flow encounters the ablator surface 36, however, a new shock wave is formed 52 that raises the pressure from $P_2$ to $P_3$. Again, this difference in pressure across the vanes will yield a spin moment force. This moment force will steadily reduce as the ablator is worn or burnt away because of the lessening area for differential pressure to act upon, and possibly because of a lessening of the value $P_3$ due to a decrease in the angle of incidence 54. When the ablative material 24 is completely consumed, only the vane support plate 22 remains and lateral sides 26 and 28 thereof are acted upon by gases of equal pressure $P_2$. Thus, no rotational spin is imparted to the vane support plate 22.

While the ablative body portion 24 is being consumed and expansion fan 44 is formed on that side of the vane the net rotation force moment is decreasing in proportion to the burning time of the rocket motor. By this phenomenon, maximum rotation imparting forces are created instantaneously upon ignition of the rocket motor to bring the rocket motor to its optimum spin rate while the rocket is still in its launching device or within a fraction of a second after leaving the launch device, after which the ablative material is completely consumed and no additional rotative moments are imparted to the rocket nozzle. The optimum spin rate is, therefore, rapidly achieved early in flight while excessive spin rates are prevented later in flight.

Due to the fact that the spin inducing forces result from the development of unequal pressures on opposite sides of the vanes are hereinabove described, it is to be understood that the vanes must be separated from one another by a sufficient distance to prevent impingement of shock waves of adjacent vanes upon surface 26 of a particular vane. When relatively large spin inducing vanes are utilized, such as those shown in FIGS. 1 and 2, sufficient lateral separation is assured by the spacing illustrated in FIG. 2, however, if much smaller vanes are utilized, it will be appreciated that the number of vanes may be substantially increased since smaller vanes require less lateral separation. It will be apparent, therefore, that the size and number of vanes employed in accordance with this invention may be selectively varied. Additionally, the thickness of the ablative body portion of the vanes may be varied as well as the compositions of the material thereof for the purpose of selectively controlling the ablation rate.

Obviously, numerous modifications and variations of the present invention are possible in light of the above teachings. It is therefore to be understood that within the scope of the appended claims the invention may be practiced otherwise than as specifically described herein.

What is claimed as new and desired to be secured by Letters Patent of the United States is:

1. A reaction thrust nozzle for spin stabilizing a rocket comprising:
   a convergent-divergent thrust nozzle adapted to be mounted in operative alignment with a rocket motor,
   a plurality of elongate spin inducing vanes mounted in said nozzle,
   said vanes each increasing in transverse cross section from its forward end toward its rearward end and having a first longitudinal sidewall thereof positioned parallel to the longitudinal axis of said nozzle and having a second longitudinal sidewall thereof angularly displaced relative to the longitudinal axis of said nozzle.

2. A device of claim 1 wherein
   at least a portion of each vane is formed of ablative material.

3. The device of claim 1 wherein
   said vanes are mounted in said nozzle at locations downstream of the nozzle throat and being equiangularly spaced radially about the longitudinal axis of said nozzle.

4. The device of claim 3 wherein
   each of said vanes includes a first body portion formed of nonablative material and having a cross section symmetric with the longitudinal axis of said rocket, and a second body portion formed of ablative material having a cross section asymmetric with the longitudinal axis of the nozzle,
   said second body portion being fixedly mounted to the first body portion.

5. The device of claim 4 wherein
   said first body portion is formed of flat plates having parallel opposed sidewalls,
   said plate sidewalls being tapered on their upstream ends to form a knife edge,
   said second body portion having the configuration of a solid right triangle and being mounted upon said first body portion such that the side of said second body portion defined by the hypotenuse of the right triangle forms a continuation of the tapered edge of said first body portion.

6. The device of claim 1 wherein
   at least a portion of each of said vanes is formed of a disintegrating material.

7. The device of claim 1 wherein
   each of said vanes being laterally separated from adjacent vanes by a distance preventing interference with the shock waves fronts occurring at said adjacent vanes when subjected to supersonic gas flow.

* * * * *